Figure 1:
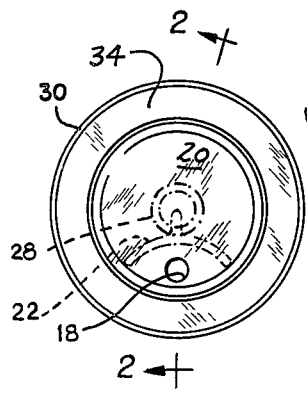

May 31, 1966     A. SABATINO     3,253,963

VENT CAP

Filed Jan. 31, 1963

INVENTOR.
Anthony Sabatino by John W. Michael
Attorney

United States Patent Office 3,253,963
Patented May 31, 1966

3,253,963
VENT CAP
Anthony Sabatino, Milwaukee, Wis., assignor to Globe Union Inc., Milwaukee, Wis., a corporation of Delaware
Filed Jan. 31, 1963, Ser. No. 255,378
1 Claim. (Cl. 136—177)

This application relates to vent caps particularly designed for dry charge batteries.

Batteries of this type are assembled and stored in a dry state in order to prolong the active life of the battery. The battery is activated by filling the cells with electrolyte. The storage time may be for periods of two to three years or more. If the battery compartments are not properly sealed during this time the capacity upon activation will be reduced resulting in a battery which will not have a proper charge upon activation. This is caused by the oxidation of the negative plates in the cell groups which is attributed to four conditions: heat, moisture, oxygen, and time of storage. Control of any one of these conditions will slow down this oxidation. It has been found that oxidation of the negative plates can be reduced materially if the battery is stored under cool temperature conditions. The cost of storage facilities to accomplish this result makes temperature control impractical. Moisture and oxygen control are the two conditions which can be controlled without any material addition to the overall cost of the battery. If a dry charge battery is properly manufactured there will be little or no negative plate oxidation if initial conditions are maintained. If, however, the battery compartments are not properly sealed, moisture will be brought into the battery compartments either by breathing of the battery cell or diffusion of moisture through the improperly sealed openings. In high humidity areas the breathing characteristic of a battery causes a particularly serious problem.

The primary object of this invention is to provide an improved vent cap for a dry charge battery that is effective to seal the battery and thus minimize the harmful effects of moisture and oxygen.

A further object of this invention is to provide a means for quickly and easily tightening and untightening the improved vent cap onto a battery cover.

These objects are accomplished by providing an improved vent cap and vent boss construction which is effective to maintain a good seal between the vent cap and the vent boss on the battery cover. The seal is formed by seating the upper edge of the vent boss in an emulsion of latex or any fluid sealing material which has been extruded into a groove in a rim formed on the vent cap. The exterior vent opening in the vent cap is closed by affixing a moisture proof tape over the opening. A special tool has been designed to firmly seat (and unseat) the vent cap in sealed relationship with the vent boss with the upper edge of the vent boss firmly pressed into the gasket material. By firmly seating the vent cap in the vent boss a good seal is insured and the possibility of casual opening of the cap is prevented. The vent cap of this invention has been found to have increased battery life up to ten times depending on storage conditions.

Figure 2:
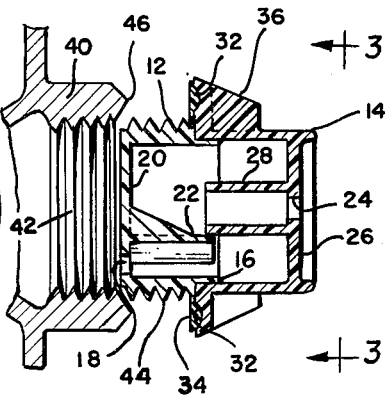
Figure 3:
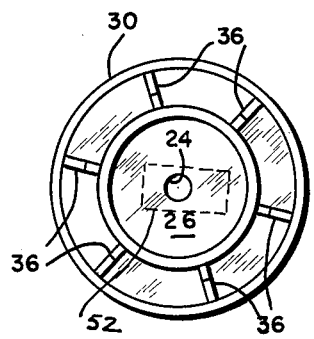
Figure 4:
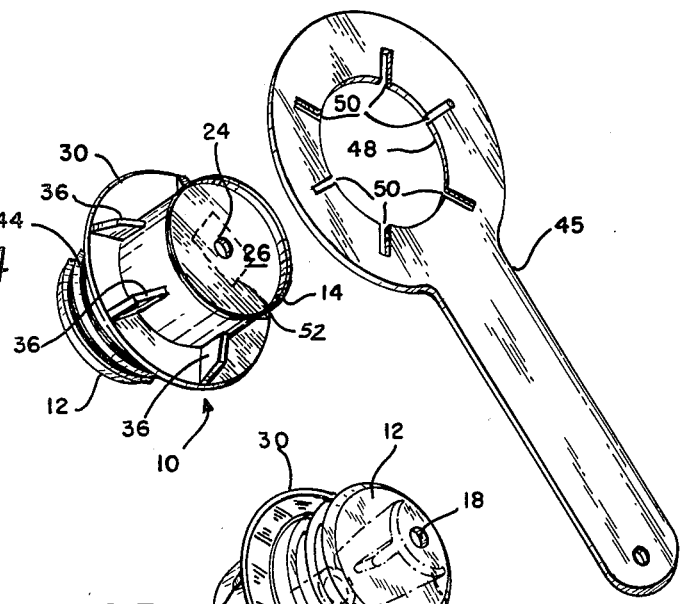
Figure 5:
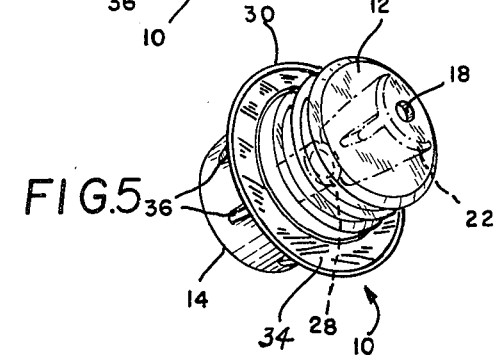

Other objects and advantages will be pointed out in or be apparent from the specification and claim, as will obvious modifications of the embodiment shown in the drawing in which:

FIG. 1 is an end view of the vent cap;
FIG. 2 is a sectional view taken on line 2—2 of FIG. 1;
FIG. 3 is a view taken on line 3—3 of FIG. 2 showing the top of the vent cap;
FIG. 4 is an isometric projection of the vent cap and special tightening wrench; and
FIG. 5 is an isometric projection of the vent cap showing the threaded end of the cap.

Referring more specifically to the drawing, a vent cap 10 is shown having a threaded cylindrical section 12 and a tightening cylindrical section 14 secured together at 16 to form an integral unit. A lower vent opening 18 is provided in end 20 of section 12 and is shielded by a baffle 22 molded integrally with end 20. An upper vent opening 24 is provided in top 26 of section 14 which opens into an integrally molded tubular section 28 which projects into the cap.

A rim 30 is molded integrally with the lower edge of section 14 and is provided with a groove 32 on its inner or lower surface. The groove is filled with a resilient gasket material 34, such as an emulsion of latex or other suitable fluid resinous material. This is readily accomplished by extruding the fluid resinous material into groove 32 while rotating the cap with the groove facing upwardly. The sealing material is then cured and sealed in the groove by evaporation of the solvent or other chemical reaction.

A number of fillets 36 are equally spaced about the outer surface of the external section to support the rim and to facilitate tightening the cover on a battery boss 40. The battery boss is threaded at 42 to receive the threaded surface 44 of section 12. The outer lip 46 of the battery boss has a V cross section (FIG. 2) which will seat snugly against the sealing material 34 in groove 32 in the rim of the cap when the cap is firmly tightened into boss 40.

A special tool 45 having a central aperture 48 and a number of slots 50 is designed to fit over section 14 and to engage fillets 36. Any other configuration could be used for the wrench so long as it cooperates with the upper contour of the cap. As an example, the external section could be shaped in the form of a hexagon or pentagon with a corresponding contour for the wrench. The caps should be standardized to one design to reduce the number of wrenches that would have to be kept on hand in order to service the batteries.

After the cap has been tightly seated in the battery boss, the vent 24 is closed to completely seal the interior of the battery cell from the atmosphere. A strip of adhesive tape 52 (shown in dotted lines in FIGS. 3 and 4) will normally suffice to seal the vent and can be easily removed when the battery is activated.

Humidity tests conducted on batteries with this type of vent cap have shown that the battery life has been increased substantially. Below is a table showing the results of one series of tests. The tests were performed on 2SM–60 ampere hour 12-volt dry charge batteries. The batteries were stored indoors in a non-controlled atmosphere in Tampa, Florida. One group of such batteries was equipped with vent caps of standard design and a second group was equipped with the improved vent caps of this invention. At the beginning of the test period and at three month intervals thereafter one battery from each group was activated by adding electrolyte and its capacity measured. The capacity measurement in all cases was made five minutes after activation with no booster charging and with an electrolyte specific gravity of 1.260. The numbers shown in the table represent the time in minutes during which the batteries tested maintained rated voltage when discharged at 150 amps at 80° F.

|  | Storage Time (Months) | | | | |
| --- | --- | --- | --- | --- | --- |
|  | 0 | 3 | 6 | 9 | 12 |
| Standard Vent Cap | 5.85 | .30 | .05 | .00 | .00 |
| Improved Vent Cap | 5.85 | 5.80 | 5.70 | 5.85 | 5.60 |

These tests indicate that the improved vent cap has materially increased the storage life of a battery particularly in high humidity areas.

Although only one embodiment of the present invention has been illustrated and described, it will be apparent to those skilled in the art that various changes and modifications may be made therein without departing from the spirit of the invention or from the scope of the appended claim.

I claim:

In a dry charge storage battery, means to maintain the interior thereof in sealed condition prior to activation of the battery comprising a battery casing having at least one threaded filler opening, said casing having on its surface an annular ridge surrounding said opening, a vent cap having a threaded cylindrical portion and a tightening cylindrical portion secured together to form an integral unit, said threaded cylindrical portion being threadedly received in said threaded opening, said tightening portion having an annular flange extending laterally thereof, the upper surface of said flange being provided with a plurality of tightening abutments formed thereon, said abutments adapted for engagement by a tightening tool to facilitate tightening said vent cap within said threaded opening, the lower surface of said flange being provided with an annular groove positioned for engagement with said circular ridge, resilient gasket material mounted within said groove and permanently sealed therein, said gasket material being distortable by said ridge when the cap is tightened in said opening, for sealing engagement with said ridge, said cap further including a vent passageway therethrough terminating in a vent opening in the exterior of the cap, and removable means for sealing the vent opening in said cap.

References Cited by the Examiner

UNITED STATES PATENTS

| | | | |
|---|---|---|---|
| 572,818 | 12/1896 | Palmer | 220—46 |
| 1,163,993 | 12/1915 | Ford | 136—178.7 |
| 1,275,768 | 8/1918 | Schuh | 220—46 |
| 1,329,181 | 1/1920 | Holland et al. | 136—6 |
| 2,611,507 | 9/1952 | Wayman | 220—46 |
| 2,708,214 | 6/1955 | Galloway | 136—177.2 |
| 2,715,152 | 8/1955 | Balzer | 220—46 |
| 2,972,001 | 2/1961 | Clingenpeel | 136—177 |
| 2,981,272 | 4/1961 | Jammal | 136—178 |

FOREIGN PATENTS 467,326  6/1914  France.

WINSTON A. DOUGLAS, *Primary Examiner.*

JOHN H. MACK, *Examiner.*

D. L. WALTON, *Assistant Examiner.*